United States Patent
Sasinowski et al.

(10) Patent No.: US 9,926,900 B2
(45) Date of Patent: Mar. 27, 2018

(54) FLUID SPRAY SHIELD AND SECONDARY RETENTION CLIP FOR A QUICK CONNECTOR JOINT

(71) Applicant: GM GLOBAL TECHNOLOGY OPERATIONS LLC, Detroit, MI (US)

(72) Inventors: Raymond H. Sasinowski, Brighton, MI (US); Adrian O. Balmaceda, Fair Haven, MI (US); Rolf B. Karlsson, Grand Blanc, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 612 days.

(21) Appl. No.: 14/597,277

(22) Filed: Jan. 15, 2015

(65) Prior Publication Data

US 2016/0208752 A1 Jul. 21, 2016

(51) Int. Cl.
| | | |
|---|---|---|
| *F16L 21/00* | (2006.01) | |
| *F02M 55/00* | (2006.01) | |
| *F16L 37/088* | (2006.01) | |
| *F16L 55/17* | (2006.01) | |

(52) U.S. Cl.
CPC ......... *F02M 55/004* (2013.01); *F16L 37/088* (2013.01); *F16L 55/1715* (2013.01); *F02M 2200/853* (2013.01); *F02M 2200/9015* (2013.01)

(58) Field of Classification Search
USPC .............................. 285/419, 373, 13, 80, 304
See application file for complete search history.

(56) References Cited

U.S. PATENT DOCUMENTS

| | | | | |
|---|---|---|---|---|
| 4,176,756 A | * | 12/1979 | Gellman | B65D 51/002 215/274 |
| 4,452,097 A | * | 6/1984 | Sunkel | E05F 11/405 285/406 |
| 4,741,559 A | * | 5/1988 | Berghman | F16L 35/00 285/419 |
| 5,015,013 A | * | 5/1991 | Nadin | F16L 25/0045 285/419 |
| 5,046,766 A | * | 9/1991 | Lomberty | F16L 25/0036 174/92 |
| 5,092,631 A | * | 3/1992 | Masnik | F16L 55/00 285/14 |
| 5,277,459 A | * | 1/1994 | Braun | H02G 3/06 174/92 |

(Continued)

FOREIGN PATENT DOCUMENTS

| | | |
|---|---|---|
| CN | 102472425 A | 5/2012 |
| CN | 102686267 | 9/2012 |

(Continued)

*Primary Examiner* — Aaron M Dunwoody
(74) *Attorney, Agent, or Firm* — Quinn IP Law

(57) ABSTRACT

A shield and clip assembly is provided for use with a joint that connects the ends of pipes conveying a fluid under pressure. The joint includes a primary retention feature for retaining the connected pipe ends. The shield and clip assembly includes a cover configured to encapsulate the joint and the ends of the pipes sufficiently to ensure that the connected ends will not fully disengage from the joint and to ensure that leakage or spray, if any, of the fluid being conveyed from a leaking joint will be attenuated or shielded. The joint may be an in-line quick connector joint.

19 Claims, 3 Drawing Sheets

(56) References Cited

U.S. PATENT DOCUMENTS

| | | | | |
|---|---|---|---|---|
| 5,647,612 | A * | 7/1997 | Yoshida | F16L 21/06 |
| | | | | 285/13 |
| 5,853,200 | A * | 12/1998 | Zieres | F16L 35/00 |
| | | | | 285/419 |
| 6,250,688 | B1 | 6/2001 | Kirby | |
| 6,311,734 | B1 * | 11/2001 | Petrovic | B05B 15/065 |
| | | | | 138/110 |
| 6,913,294 | B2 * | 7/2005 | Treverton | F16L 21/06 |
| | | | | 285/334.5 |
| 7,014,225 | B1 * | 3/2006 | Goodsel | F16L 23/04 |
| | | | | 285/363 |
| 2004/0183305 | A1 * | 9/2004 | Fisher | A61M 39/1011 |
| | | | | 285/419 |
| 2006/0255592 | A1 * | 11/2006 | Minemyer | F16L 21/08 |
| | | | | 285/373 |
| 2008/0054628 | A1 * | 3/2008 | Beck | F16L 59/10 |
| | | | | 285/47 |
| 2013/0327415 | A1 * | 12/2013 | Camp, Jr. | F16L 47/32 |
| | | | | 137/15.09 |

FOREIGN PATENT DOCUMENTS

| | | |
|---|---|---|
| CN | 203477710 U | 3/2014 |
| CN | 105431666 A | 3/2016 |
| JP | 2008275079 A | 11/2008 |

* cited by examiner

FLUID SPRAY SHIELD AND SECONDARY RETENTION CLIP FOR A QUICK CONNECTOR JOINT

TECHNICAL FIELD

This disclosure relates to a combination fluid spray shield and secondary retention clip for a quick connector joint.

BACKGROUND

A vehicle may include a joint that connects the ends of pipes conveying fluid under pressure. The joint may include a primary retention feature for retaining the pipe ends. For example, transmission fluid may be conveyed between a transmission and a transmission fluid cooler by pipes connected to each other with an in-line quick connector joint having a primary retention feature. Other examples include, but are not limited to, conveyance of engine oil and conveyance of rear differential fluid to and from respective coolers by pipes connected to each other with an in-line quick connector joint having a primary retention feature. It may be beneficial to provide a secondary retention device or clip to ensure that the ends of the pipes will not fully disengage from the joint if the primary retention feature does not function properly. It may also be beneficial to provide a shield or barrier to ensure that leakage or spray, if any, of the fluid from a leaking joint will be attenuated or blocked from contacting the surfaces of nearby components. This disclosure applies to any machine or manufacture which includes a joint that connects the ends of pipes conveying fluid under pressure.

SUMMARY

A shield and clip assembly is provided for use with a joint that connects the ends of pipes conveying a fluid under pressure and includes a primary retention feature for retaining the connected pipe ends. The shield and clip assembly includes a cover configured to encapsulate the joint and the ends of the pipes sufficiently to ensure that the connected ends will not fully disengage from the joint and to ensure that leakage or spray, if any, of the fluid being conveyed from a leaking joint will be attenuated or shielded. The joint may be an in-line quick connector joint.

A vehicle is also provided. The vehicle includes a quick connector joint and a cover. The quick connector joint connects the ends of pipes conveying a fluid under pressure and includes a primary retention feature for retaining the connected pipe ends. The cover is configured to encapsulate the quick connector joint and the ends of the pipes sufficiently to ensure that the connected ends will not fully disengage from the quick connector joint and that leakage or spray, if any, of the fluid from a leaking joint will be attenuated or shielded.

The shield and clip assembly and the vehicle provide a secondary retention device or clip to ensure that the ends of the pipes conveying fluid under pressure will not fully disengage from the joint if the primary retention feature does not function properly. They also provide a shield or barrier to ensure that leakage or spray, if any, of the fluid from a leaking joint will be attenuated or blocked from contacting nearby surfaces.

The above features and advantages and other features and advantages of the present teachings are readily apparent from the following detailed description of the best modes for carrying out the present teachings when taken in connection with the accompanying drawings.

DETAILED DESCRIPTION

Figure 1:
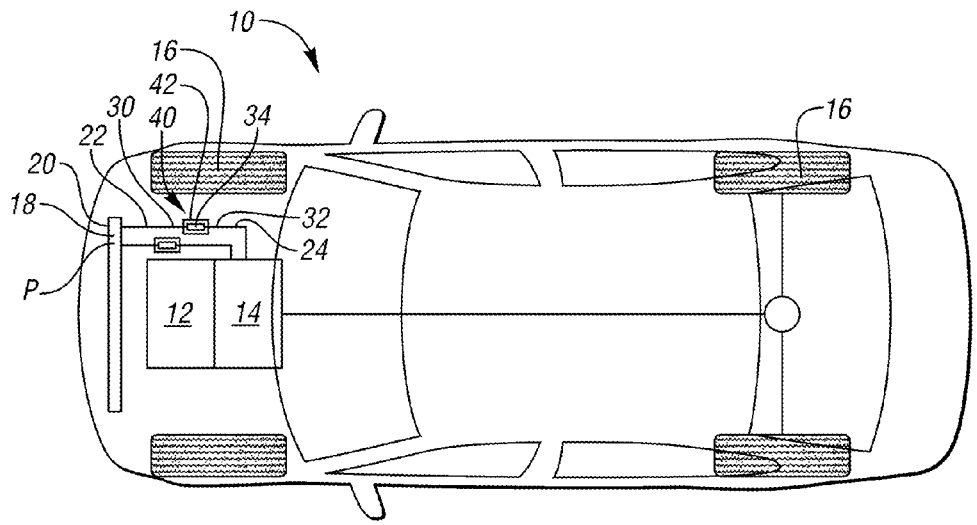
FIG. 1 is a schematic plan view illustration of a vehicle having a quick connector joint that connects the ends of pipes conveying fluid under pressure and a combination fluid spray shield and secondary retention clip for use with the quick connector joint.

Referring to the drawings, wherein like reference numbers refer to like components throughout the views, FIG. 1 shows a vehicle 10 including an engine 12, a transmission 14 operatively connected to the engine 12, and one or more wheels 16 operatively connected to the transmission 14. The vehicle may include a fluid cooler 18. The vehicle 10 includes a first pipe 22 and a second pipe 24. The pipes 22, 24 convey a fluid 20 under pressure P. The fluid 20 under pressure P may be transmission fluid and may be conveyed between the transmission 14 and the fluid cooler 18. Alternatively, the fluid 20 may be engine oil, differential fluid, or any other fluid used in the vehicle 10. And, the pipes 22, 24 may convey the fluid 20 under pressure P between any two components of the vehicle 10 as necessary for the function of the vehicle 10.

Figure 2:
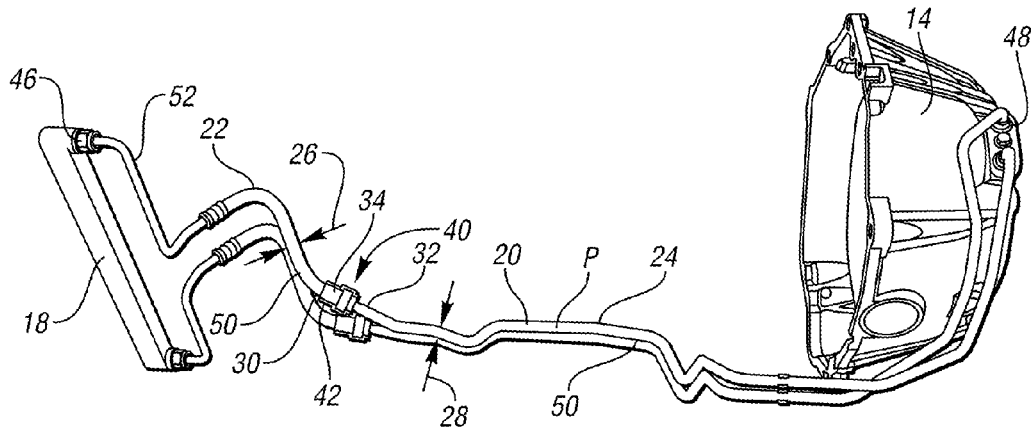
FIG. 2 is a fragmentary schematic perspective illustration of a portion of the vehicle of FIG. 1, showing the pipes, the quick connector joint, and the combination fluid spray shield and secondary retention clip of FIG. 1 in greater detail.
Figure 4:
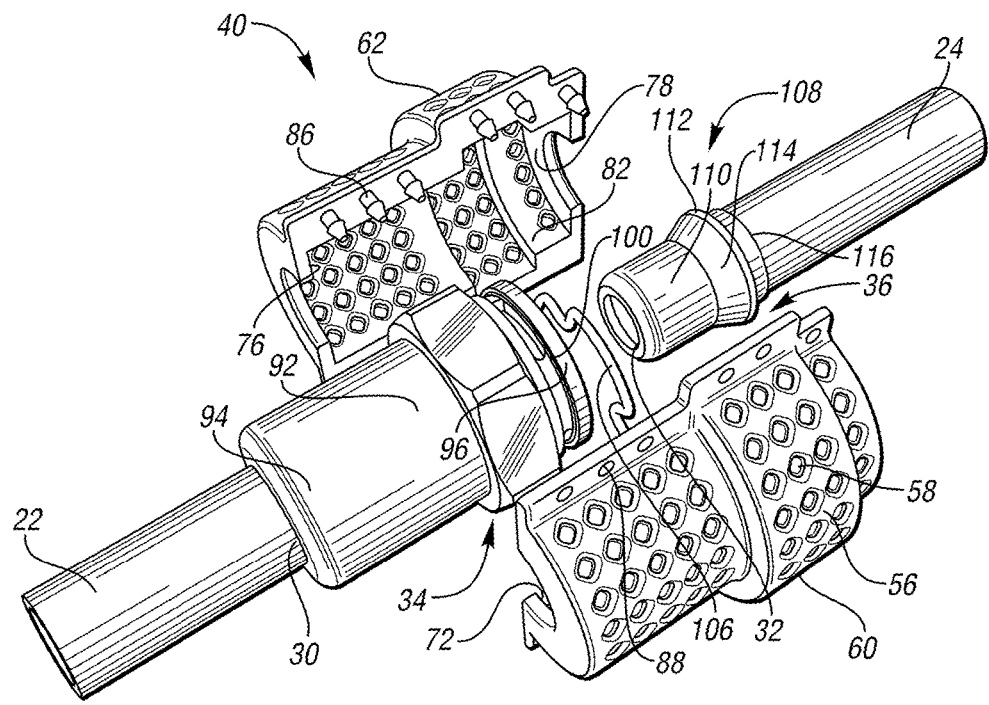
FIG. 4 is an exploded perspective view of the quick connector joint and the fluid spray shield and secondary retention clip of FIG. 1.
Figure 5:
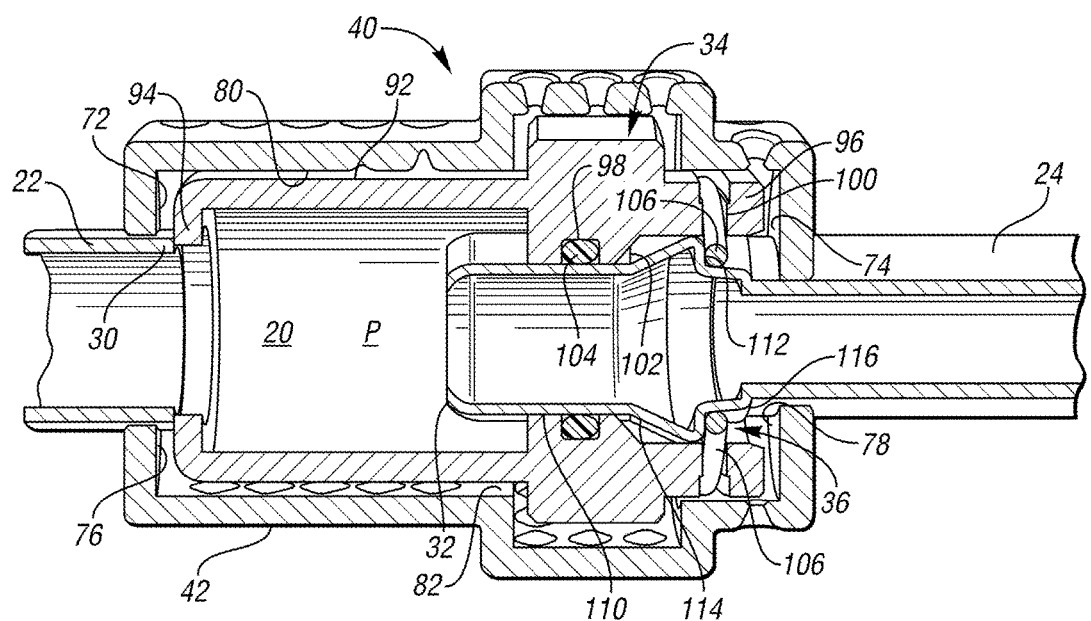
FIG. 5 is a schematic cross-sectional illustration, partially in elevation, of the quick connector joint and the fluid spray shield and secondary retention clip of FIG. 1 taken at line 5-5 of FIG. 3.

Referring now to FIG. 2, the first pipe 22 has a first pipe end 30 and the second pipe 24 has a second pipe end 32. The vehicle 10 includes a joint 34 that connects the ends 30, 32 of pipes 22, 24. The joint 34 includes a primary retention feature 36, as shown in FIGS. 4 and 5, for retaining the connected pipe ends 32, 34. A nonlimiting example of the primary retention feature 36, will be described below with reference to FIGS. 5 and 6. Referring again to FIG. 2, the joint 34 may be an in-line quick connector joint, as shown, connecting the ends 30, 32 of pipes 22, 24. Alternatively, joint 34 may be a fixed quick connector joint 46, with one portion of the quick connector joint 46 fixed to a vehicle 10 component, as shown. In another alternative, the joint 34 may be a threaded connector joint 48, with one portion fixed to a vehicle 10 component, as shown, or in an in-line configuration (not shown). Any other suitable joint configuration may be used for joint 34.

The first pipe 22 has a first outside diameter 26 and the second pipe 24 has a second outside diameter 28. The first diameter 26 and the second diameter 28 may be the same or may be different from each other. The diameters 26, 28 may be any size necessary for the proper function of the vehicle 10. As a nonlimiting example, the diameters 26, 28 may be in the range of about ⅜ inch to ½ inch. The pipes 22, 24 may be a flexible hose 50 or a rigid tube 52. The flexible hose 50 may be made of a rubber, a plastic, a composite, or any other suitable material. The rigid tube 52 may be made of a metal, a plastic, a composite, or any other suitable material.

The vehicle 10 includes a combination fluid spray shield and secondary retention clip assembly 40 for use with the joint 34. The shield and clip assembly 40 includes a cover 42. As will be explained in greater detail below, with reference to FIGS. 3-6B, the cover 42 is configured to encapsulate the joint 34 and the ends 30, 32 of the pipes 22, 24 sufficiently to ensure that the connected ends 30, 32 will not fully disengage from the joint 34 and that leakage or spray, if any, of the fluid 20 from a leaking joint 34 will be attenuated or shielded from spraying on adjacent components of the vehicle 10.

Figure 3:
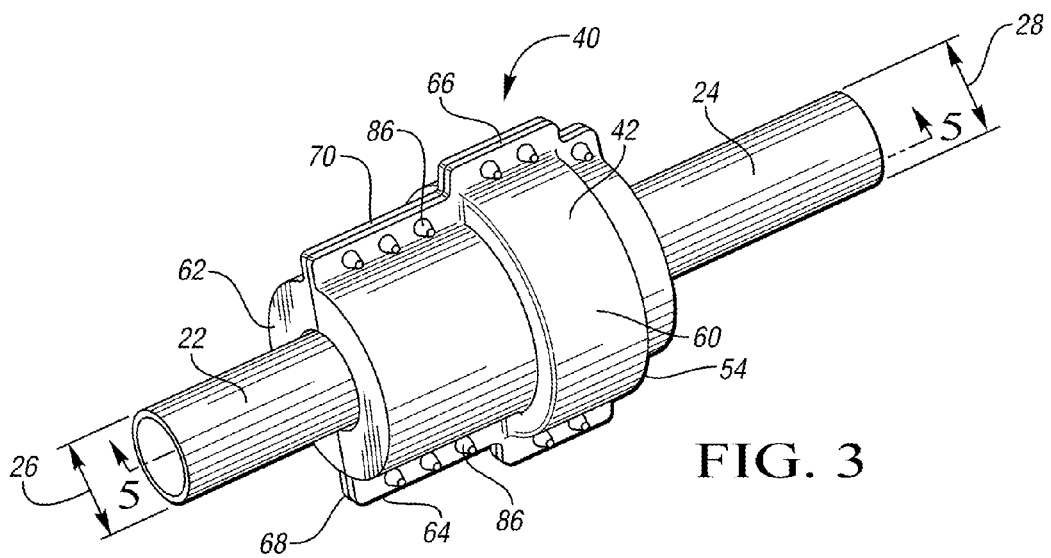
FIG. 3 is a schematic perspective view of the fluid spray shield and secondary retention clip of FIG. 1 with the quick connector joint and the pipe ends enclosed in the combination fluid spray shield and secondary retention clip.

Referring now to FIG. 3, the cover 42 is shown encapsulating the joint 34. The cover 42 includes a first portion 60 and separate a second portion 62. The first portion 60 is connected to the second portion 62, as described below, to assemble the cover 42 and to encapsulate the joint 34 and the pipes 22, 24. The first portion 60 has a first portion first edge 64 and a first portion second edge 66. The second portion 62 has a second portion first edge 68 and a second portion second edge 70.

The cover 42 may be in a solid configuration 54, and may form substantially no openings around the joint 34. However, the cover 42 is not sealed to the pipes 22, 24 and allows fluid 20 leakage, if any, from the joint 34 to exit the cover 42 through clearances around its perimeters and connected edges. The cover 42 encapsulation of the joint 34 ensures that leakage or spray, if any, of the fluid 20 from a leaking joint 34 will be attenuated or shielded from spraying on adjacent components of the vehicle 10. The cover 42 may be made of a plastic, a rubber, a metal, a composite material, or any other suitable material.

The cover 42 may include a fastener 86 located at or near one of the edges 64, 66, 68, 70 to ease assembly of the cover 42 and encapsulation of the joint 34 and the pipes 22, 24. The fastener 86 may be a snap fit fastener, as shown, or a tab or clip fastener (not shown). The cover 42 may form a fastener opening or cutout 88 at or near one of the edges 64, 66, 68, 70. The fastener opening or cutout 88 may be a hole, as shown, or a slot (not shown), or any other suitable opening or cutout and may cooperate with the fastener 86 to fasten the cover portions 60, 62 to each other to assemble the cover 42 and encapsulate the joint 34 and the pipes 22, 24.

Referring now to FIGS. 4 and 5, the cover 42 includes a first portion shield surface 80 and a second portion shield surface 82. The cover 42 may be in a mesh configuration 56 and may form a plurality of mesh openings 58. The mesh openings 58 allow fluid 20 leakage, if any, from the joint 34 to exit the cover 42. The shield surfaces 80, 82 ensure that leakage or spray, if any, of the fluid 20 from a leaking joint 34 will be attenuated or shielded from spraying on adjacent components of the vehicle 10.

The joint 34 may include a quick connector fitting 92 having a first end 94 and a second end 96. The first end 94 may be connected and sealed to the first pipe end 30. The connection may be by soldering, brazing, welding, threading, or any other suitable method. The second end 96 may be configured to receive an endform 108, formed on the second pipe end 32, as described below. The quick connector fitting 92 may form a seal retention feature 98. A seal 104 may be retained in the seal retention feature 98. The seal 104 may be an O-ring seal, as shown, or may be any other seal suitable to seal the fluid 20 under pressure P within the joint 34 when the pipe 22, 24 ends 30, 32 are connected. The quick connector fitting 92 may form a retaining clip feature 100. A retaining clip 106 may be retained in the retaining clip feature 100. The quick connector fitting 92 may include a quick connector fitting stop feature 102.

The second pipe 24 endform 108 may include a sealing feature 110, a first retaining feature 112, an endform stop feature 114, and a second retaining feature 116. The sealing feature 110 is configured to cooperate with the seal 104 and the quick connector fitting 92 to seal the fluid 20 at pressure P in the joint 34 when the ends 30, 32 of pipes 22, 24 are connected. The first retention feature 112 is configured to cooperate with the retaining clip 106 and the retaining clip feature 100 to retain the second pipe end 32 in the quick connector fitting 92. The primary retention feature 36 of joint 34 may include the retaining clip feature 100, the retaining clip 106, and the first retention feature 112. Any other suitable configuration of the primary retention feature 36 may be used. The endform stop feature 114 is configured to cooperate with the quick connector fitting stop feature 102 to prevent the second pipe end 32 from being inserted too far in the quick connector fitting 92.

The cover 42 is configured to encapsulate the joint 34 and the ends 30, 32 of the pipes 22, 24 sufficiently to ensure that the connected ends 30, 32 will not fully disengage from the joint 34 if the primary retention feature does not function properly. In particular, the cover first portion 60 may include a first pipe retention feature 72 and a second pipe retention feature 74. The cover second portion 62 may include a first pipe retention feature 76 and a second pipe retention feature 78. The first pipe retention features 72, 76 may cooperate with the quick connector fitting first end 94 and the second pipe retention features 74, 78 may cooperate with the endform second retaining feature 116 to ensure that the connected ends 30, 32 will not fully disengage from the joint 34 if the primary retention feature 36 does not function properly.

Figure 6A:
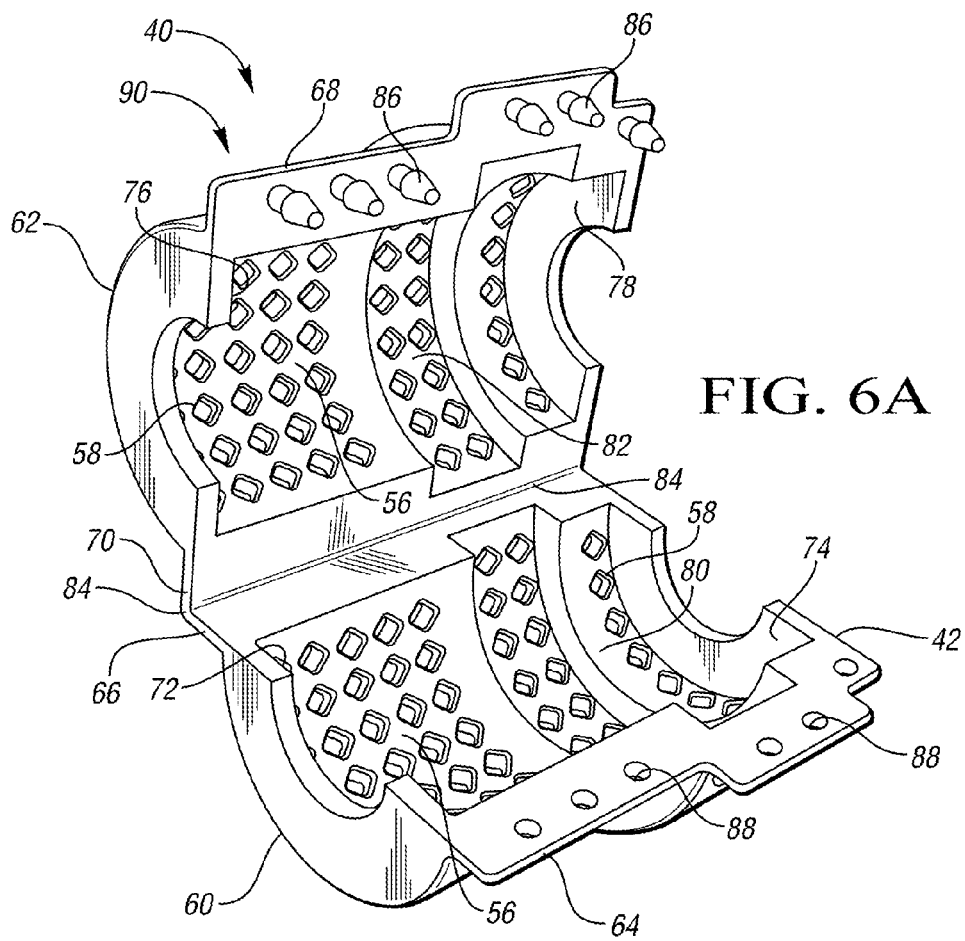
FIG. 6A is a schematic perspective illustration of the fluid spray shield and secondary retention clip of FIG. 1 in a clam shell configuration which is open.
Figure 6B:
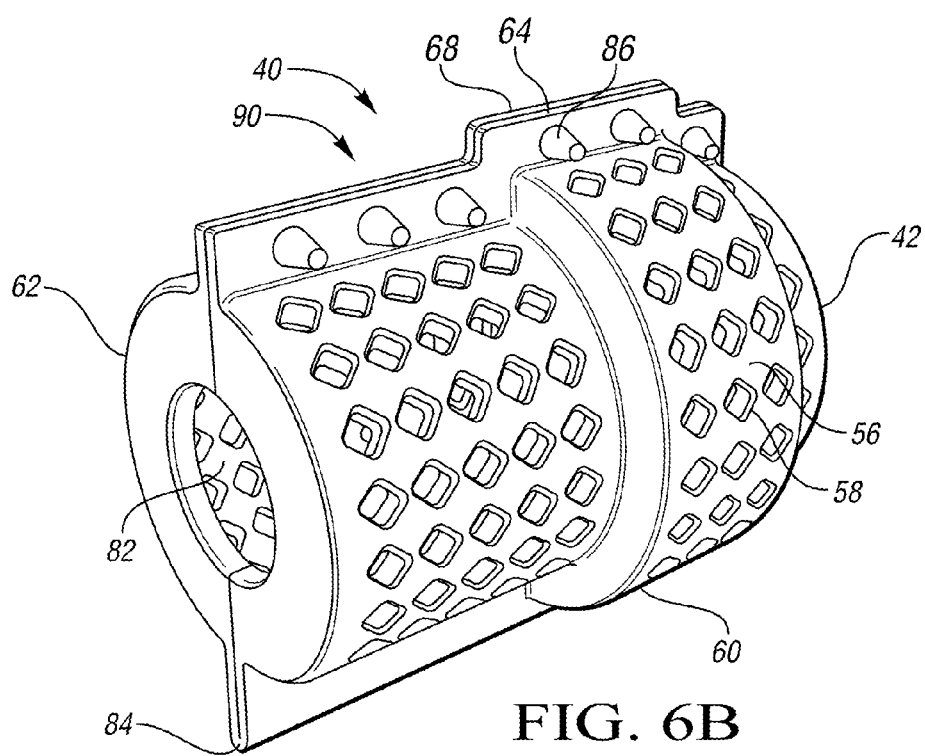
FIG. 6B is a schematic perspective illustration of the fluid spray shield and secondary retention clip of FIG. 1 in a clam shell configuration which is closed.

Referring now to FIGS. 6A and 6B, the cover 42 may be in a claim shell configuration 90 to ease the encapsulation of the joint 34 and the ends 30, 32 of the pipes 22, 24 during assembly. The clam shell configuration 90 may include a hinge 84 located at the second edges 66, 70 and a fastener 86 located at or near one of the first edges 64, 68 to further ease the encapsulation of the joint 34 and the ends 30, 32 of the pipes 22, 24 during assembly. The hinge 84 may be a living hinge, as shown, or any other suitable hinge configuration. The fastener 86 may be a snap fit fastener, as shown, or any other suitable fastener. The cover 42 may form a fastener opening or cutout 88 at or near one of the first edges 64, 68. The fastener opening or cutout 88 may be a hole, as shown, or a slot (not shown), or any other suitable opening or cutout and may cooperate with the fastener 86 to fasten the first edges 64, 68 to each other to assemble the cover 42 and encapsulate the joint 34 and the pipes 22, 24.

Referring back to FIGS. 2 and 3, the combination fluid spray shield and secondary retention clip 40 may be configured to encapsulate the joint 34 and the ends 30, 32 of the pipes 22, 24 over a range of pipe diameters 26, 28. The range of pipe diameters may be about ⅜ inch to ½ inch.

While the best modes for carrying out the many aspects of the present teachings have been described in detail, those familiar with the art to which these teachings relate will recognize various alternative aspects for practicing the present teachings that are within the scope of the appended claims.

The invention claimed is:

1. A shield and clip assembly for use with a joint connecting the ends of pipes conveying a fluid under pressure and including a primary retention feature for retaining the connected pipe ends, the shield and clip assembly comprising:
   a cover configured to encapsulate the joint and the ends of the pipes sufficiently to ensure that the connected ends will not fully disengage from the joint and that leakage or spray, if any, of the fluid from a leaking joint will be attenuated or shielded;
   wherein the cover forms a plurality of openings in a mesh configuration.

2. The shield and clip assembly of claim 1, wherein the cover is configured to encapsulate a quick connector joint.

3. The shield and clip assembly of claim 1, wherein the cover is configured to encapsulate an in-line quick connector joint.

4. The shield and clip assembly of claim 1, wherein the cover is a plastic or a rubber.

5. The shield and clip assembly of claim 1, wherein the cover is a metal.

6. The shield and clip assembly of claim 1, wherein the cover is configured as a claim shell to ease the encapsulation of the joint and the ends of the pipes during assembly.

7. The shield and clip assembly of claim 6, wherein the cover includes a hinge and a fastener to further ease the encapsulation of the joint and the ends of the pipes during assembly.

8. The shield and clip assembly of claim 7, wherein the hinge is a living hinge; and wherein the fastener is a snap-fit fastener.

9. The shield and clip assembly of claim 1, wherein the cover is configured to encapsulate the joint and the ends of the pipes over a range of pipe diameters.

10. The shield and clip assembly of claim 1, wherein the cover is configured to encapsulate the joint and the ends of the pipes over a range of pipe diameters from about ⅜ inch to ½ inch.

11. A vehicle comprising:
    a quick connector joint connecting the ends of pipes conveying a fluid under pressure and including a primary retention feature for retaining the connected pipe ends; and
    a cover configured to encapsulate the quick connector joint and the ends of the pipes sufficiently to ensure that the connected ends will not fully disengage from the quick connector joint and that leakage or spray, if any, of the fluid from a leaking joint will be attenuated or shielded;
    wherein the cover forms a plurality of openings in a mesh configuration.

12. The vehicle of claim 11, wherein the quick connector joint is an in-line quick connector joint.

13. The vehicle of claim 11, wherein the cover is a plastic or a rubber.

14. The vehicle of claim 11, wherein the cover is a metal.

15. The vehicle of claim 11, wherein the cover is configured as a claim shell to ease the encapsulation of the quick connector joint and the ends of the pipes during assembly.

16. The vehicle of claim 15, wherein the cover includes a hinge and a fastener to further ease the encapsulation of the quick connector joint and the ends of the pipes during assembly.

17. The vehicle of claim 16, wherein the hinge is a living hinge; and the fastener is a snap-fit fastener.

18. The vehicle of claim 11, wherein the pipes have a diameter; and wherein the cover is configured to encapsulate the quick connector joint and the ends of the pipes over a range of pipe diameters.

19. The vehicle of claim 18, wherein the range of pipe diameters is about ⅜ inch to ½ inch.

* * * * *